United States Patent
Barton et al.

(10) Patent No.: US 9,104,577 B2
(45) Date of Patent: *Aug. 11, 2015

(54) OPTIMIZING MEMORY BANDWIDTH CONSUMPTION USING DATA SPLITTING WITH SOFTWARE CACHING

(71) Applicant: International Business Machines Corporation, Armonk, NY (US)

(72) Inventors: Christopher M. Barton, Stouffville (CA); Shimin Cui, Toronto (CA); Satish K. Sadasivam, Tamilnadu (IN); Raul E. Silvera, Woodbridge (CA); Mahavi G. Valluri, Austin, TX (US); Steven W. White, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 234 days.

This patent is subject to a terminal disclaimer.

(21) Appl. No.: 14/010,984

(22) Filed: Aug. 27, 2013

(65) Prior Publication Data

US 2015/0067260 A1 Mar. 5, 2015

(51) Int. Cl.
*G06F 9/45* (2006.01)
*G06F 12/08* (2006.01)

(52) U.S. Cl.
CPC .............. *G06F 12/0837* (2013.01); *G06F 8/41* (2013.01); *G06F 12/0875* (2013.01); *G06F 2212/1044* (2013.01)

(58) Field of Classification Search
CPC ..... G06F 8/443; G06F 8/434; G06F 12/0837; G06F 12/0875; G06F 9/45
See application file for complete search history.

(56) References Cited

U.S. PATENT DOCUMENTS

| 6,457,023 | B1 * | 9/2002 | Pinter et al. ........................... 1/1 |
| 7,124,249 | B1 * | 10/2006 | Darcy ........................... 711/122 |
| 7,451,438 | B2 * | 11/2008 | Kielstra et al. ................. 717/154 |
| 7,555,748 | B2 | 6/2009 | Archambault et al. |
| 7,765,534 | B2 | 7/2010 | Archambault et al. |
| 8,015,556 | B2 | 9/2011 | Cui et al. |
| 8,122,442 | B2 | 2/2012 | Lin |

(Continued)

OTHER PUBLICATIONS

Brendon Cahoon et al., "Data Flow Analysis for Software Prefetching Linked Data Structures in Java", [Online], 2001, pp. 1-12, [Retrieved from Internet on May 31, 2015], <http://investigacion.ac.upc.es/conferencies/PACT01/papers/s9p3.pdf>.*

(Continued)

*Primary Examiner* — Thuy Dao
*Assistant Examiner* — Ziaul A Chowdhury
(74) *Attorney, Agent, or Firm* — Scully, Scott, Murphy & Presser, P.C.

(57) ABSTRACT

A computer processor collects information for a dominant data access loop and reference code patterns based on data reference pattern analysis, and for pointer aliasing and data shape based on pointer escape analysis. The computer processor selects a candidate array for data splitting wherein the candidate array is referenced by a dominant data access loop. The computer processor determines a data splitting mode by which to split the data of the candidate array, based on the reference code patterns, the pointer aliasing, and the data shape information, and splits the data into two or more split arrays. The computer processor creates a software cache that includes a portion of the data of the two or more split arrays in a transposed format, and maintains the portion of the transposed data within the software cache and consults the software cache during an access of the split arrays.

12 Claims, 6 Drawing Sheets

(56) References Cited

U.S. PATENT DOCUMENTS

| | | | |
|---|---|---|---|
| 8,146,070 | B2 | 3/2012 | Archambault et al. |
| 8,161,464 | B2 | 4/2012 | Archambault et al. |
| 8,185,881 | B2* | 5/2012 | Brand et al. ............... 717/132 |
| 8,589,888 | B2* | 11/2013 | Cui et al. ................... 717/125 |
| 8,694,978 | B1* | 4/2014 | Rus et al. ................... 717/154 |
| 2003/0140336 | A1* | 7/2003 | Kawahito et al. .......... 717/154 |
| 2008/0005473 | A1* | 1/2008 | Chen et al. ................. 711/118 |
| 2008/0052693 | A1* | 2/2008 | Archambault et al. ..... 717/151 |
| 2009/0019425 | A1* | 1/2009 | Archambault et al. ..... 717/120 |
| 2009/0248985 | A1 | 10/2009 | Ayguade et al. |

OTHER PUBLICATIONS

Radu Rugina et al., "Pointer Analysis for Multithreaded Programs", [Online], ACM 1999, pp. 77-90, [Retrieved from Internet on May 31, 2015], <http://delivery.acm.org/10.1145/310000/301645/p77-rugina.pdf>.*

Chi-Keung Luk et al., "Compiler-Based Prefetching for Recursive Data Structures", [Online], ACM 1996, pp. 222-233, [Retrieved froom Internet on May 31, 2015], <http://delivery.acm.org/10.1145/240000/237190/p222-luk.pdf>.*

Tomonori Takada et al., "Dependence-Cache Slicing: A Program Slicing Method Using Lightweight Dynamic Information", [Online], IEEE 2002, pp. 1-9, [Retrieved from Internet on May 31, 2015], <http://ieeexplore.ieee.org/stamp/stamp.jsp?tp=&arnumber=1021338>.*

Zhao et al, "Forma: A Framework for Safe Automatic Array Reshaping", Journal, ACM Transactions on Programming Languages and Systems (TOPLAS) TOPLAS Homepage archive, vol. 30 Issue 1, Nov. 2007, Article No. 2 ACM New York, NY, USA, doi>10.114511290520.1290522.

* cited by examiner

```
for (i=0; i<reg->size; i++) {
    if   ((reg->node[i].state & ((MAX_UNSIGNED) 1 << control)))
         reg->node[i].state ^= ((MAX_UNSIGNED) 1 << target);
}
```
410

EXAMPLE CODE AFTER SPLITTING DATA                                    420
```
flush (reg->node->cache_data,
       reg->node->cache_address,
       reg->node->cache_dirty);
for (i=0; i<reg->size; i++) {
    if (reg->node->split_array[control] [i/64] >> (63-i%64))
        reg->node->split_array[target] [i/64] ^= (1ull << (63-i%64));
}
```

FIG. 4

OPTIMIZING MEMORY BANDWIDTH CONSUMPTION USING DATA SPLITTING WITH SOFTWARE CACHING

BACKGROUND OF THE INVENTION

The present invention relates generally to the field of computer memory, and more particularly to optimizing cache bandwidth consumption.

Memory latency and memory bandwidth limitations are two important factors that limit the performance of some applications. Memory latency defines how long it takes for a computer processor command to request data from the memory and the memory returning the data requested. Memory bandwidth is a measure of how fast the data flows from memory to the processor. However, memory bandwidth and memory latency are tradeoffs. The greater the bandwidth, the longer it takes to assemble all of the memory data that is being sent to the processor. Assembling 64 bits of data just slows down the overall transaction when the processor only requires one byte.

Memory bandwidth limitations are likely to become worse with the current trend towards multithreaded and multi-core processors, since the memory bandwidth is increasing much more slowly than the speed of the processors. Various optimization techniques have been proposed to reduce memory latency and to improve the memory bandwidth utilization. One such technique is data splitting performed by a compiler operation.

A compiler translates a software program written in a high-level programming language that is suitable for human programmers, into the low-level machine language that is required by computers. Data splitting has been proven to be an effective compiler transformation to improve data locality and reduce the memory footprint, resulting in better data cache efficiency, especially for loop iterations that only manipulate certain fields of the array. In the existing production compilers, an array of data structures is split into two or more arrays of smaller data structures in terms of the structure fields and the splitting is applied across the entire program by modifying all the references of that structure type. When two different regions in an application access the same hot fields with different code patterns, this data splitting mechanism may not realize the complete performance potential possible. Consider the following example code abstracted from memory-bound benchmark of CPU2006 libquantum (gates.c):

```
for (i=0; i<reg->size; i++ {
if ((reg->node {i}.state & ((MAX_UNSIGNED) 1 << control)))
reg->note [i].state ^= ((MAX_UNSIGNED) 1 << target);
}
```

This is one of the hottest loops in the benchmark. The issue with this loop is the poor cache utilization as a result of access to the 16-byte struct "node" (which in turn is part of reg struct). Every time an access to the struct node is made, only one or two bits of the variable "state" are used, whereas the other half of the struct "node" and the other bits of the variable "state" are wasted in the cache as they are eventually evicted from the cache without being used. Moving unwanted data into the cache is a waste of memory bandwidth and cache. Existing compilers improve the cache utilization by splitting the two fields of the struct "node" into two separate arrays. This may improve cache utilization but may be still be far short of the optimal cache utilization, however further splitting data may result in bit manipulation overhead in other regions of the program when the variable state is accessed differently.

BRIEF SUMMARY

Embodiments of the present invention disclose a method, computer program product, and system for data splitting of an array using a software cache. A computer processor collects information for a dominant data access loop and reference code patterns based on data reference pattern analysis, and for pointer aliasing and data shape based on pointer escape analysis. The computer processor selects a candidate array for data splitting based on the reference code patterns, the pointer aliasing, and the data shape information, wherein the candidate array is referenced by a dominant data access loop. The computer processor determines a data splitting mode by which to split the data of the candidate array, based on the reference code patterns, the pointer aliasing, and the data shape information. The computer processor splits the data of the candidate array into two or more split arrays, based on the reference code pattern. The computer processor creates a software cache wherein the software cache includes a portion of the data of the two or more split arrays in a transposed format, and the computer processor maintains the portion of the data of the two or more split arrays in the transposed format within the software cache and consults the software cache during an access of the two or more split arrays.

BRIEF DESCRIPTION OF THE SEVERAL VIEWS OF THE DRAWINGS

FIG. 4 illustrates exemplary code of an iterative loop, before and after applying data splitting with a software cache, in accordance with an embodiment of the present invention.

DETAILED DESCRIPTION

Figure 1:
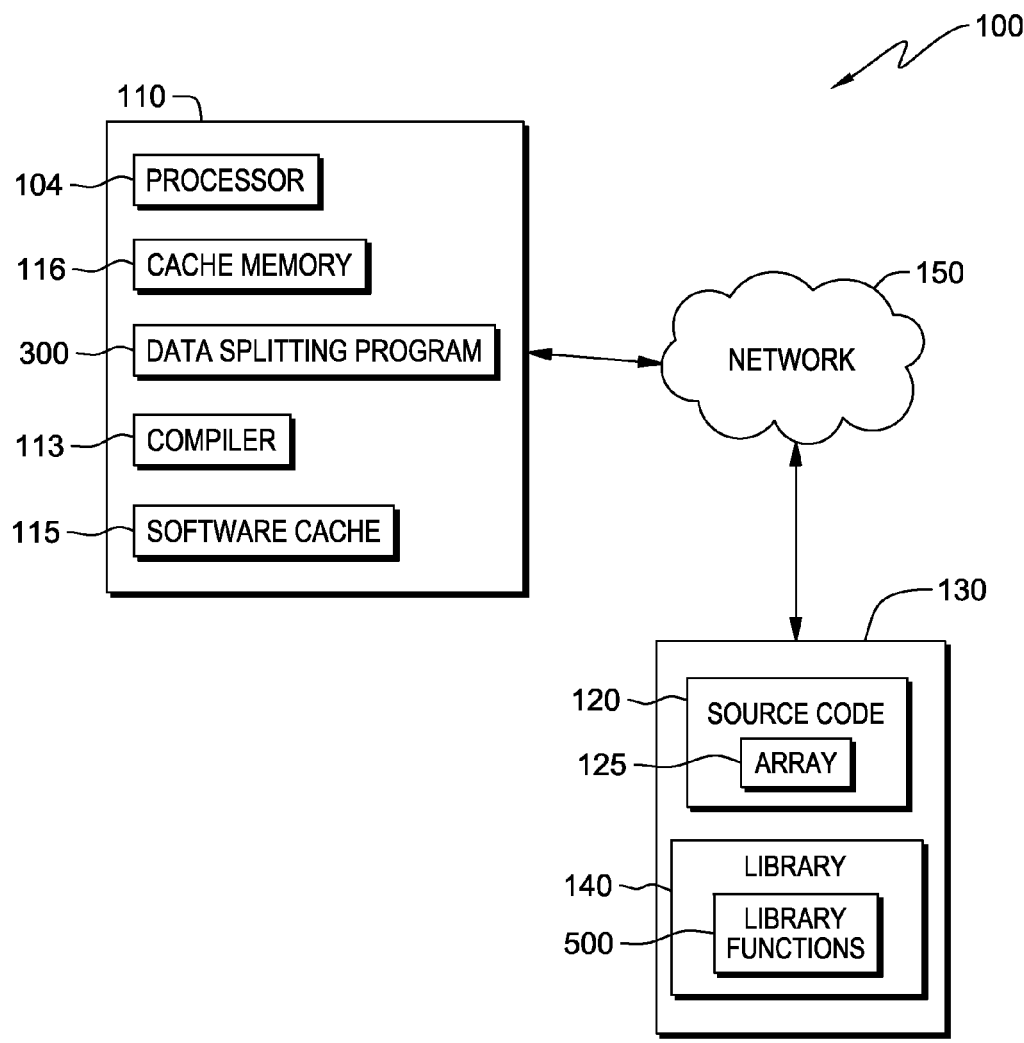
FIG. 1 is a functional block diagram illustrating a distributed data processing environment, in accordance with an embodiment of the present invention.

Embodiments of the present invention recognize that moving unwanted memory into cache is a waste of memory bandwidth and cache. Existing compilers improve the cache utilization by splitting the data structure into two separate data structures. Ideally, optimal cache utilization is reached for high iteration loops if the object variable is further split so that only the referenced bits are fetched into the cache. This may introduce bit manipulation overhead in other regions of the program code when the variable is accessed differently.

Embodiments of the present invention provide a novel and efficient method for data splitting of static arrays or dynamic object aggregate member arrays in order to achieve optimal cache utilization and better data cache efficiency for the entire program at runtime. The method is to select and further split the data type of an array or an aggregate member based on the code pattern of its references in the program. Embodiments of the present invention create a small software cache that is used to record a portion of the most recently referenced data in the original data type format, which is a transposed format of the split data, and is consulted during the access of the split data. Program references requiring the original data type format make use of the software cache data, eliminating bit manipulation overhead that would otherwise be required. The method is especially useful for memory-bound applications for which the existing data splitting techniques may not realize the complete performance potential possible.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a data processing system, generally designated 100, in accordance with one embodiment of the present invention.

FIG. 1 is a functional block diagram illustrating distributed data processing environment 100, in accordance with an embodiment of the present invention. FIG. 1 includes server computer 110, and storage device 130, all interconnected via network 150.

Network 150 can be, for example, a local area network (LAN), a wide area network (WAN) such as the Internet, or a combination of the two, and can include wire or wireless connections. In general, network 150 can be any combination of connections and protocols that will support communications via various channels between server computer 110, and storage device 130, in accordance with an embodiment of the invention. In one embodiment of the present invention, server computer 110, and storage device 130 may be physically integrated into a single computing system, in which case network 150 represents a system bus, connecting components of the computing system and enabling communications between components.

Storage device 130 is depicted as including source code 120, which further includes as an exemplary data type, array 125. Storage device 130 may be any tangible storage medium capable of storing machine-readable program instructions and accessible via network 150.

Source code 120 is a software program written in a high-level programming language. Source code 120 is shown in an exemplary embodiment, residing on storage device 130 and including array 125 which may be dynamic or static, and may be an array or a member of an aggregate structure. Source code 120, including array 125, resides on a storage device and is accessible, via network 150, by compiler 113 and data splitting program 300, both operating on server computer 110.

Storage device 130 also includes library 140, which is a collection of implementations of programming behavior, written in terms of a language that has a well-defined interface by which the behavior is invoked. In addition, the behavior is provided for reuse multiple times within a program or by multiple independent programs. The value of a library is the reuse of the programming behavior. In embodiments of the present invention, library 140 includes library functions 500, which are program behaviors used by data splitting program 300 to manage software cache 115, and will be discussed in greater detail in regards to FIG. 5.

Server computer 110 is illustrated as including processor 104, cache memory 116, data splitting program 300, compiler 113, and software cache 115. Server computer 110 can be a desktop computer, laptop computer, a specialized computer server, a client computer, tablet, or netbook personal computer (PC), a personal digital assistant (PDA), a smart phone, a mainframe computer, a web server computer, or a networked server computer. Further, server computer 110 can represent computing systems utilizing clustered computers and components to act as single pools of seamless resources when accessed through network 150, as is common in data centers and with cloud computing applications. In general, server computer 110 is representative of any programmable electronic device or combination of programmable electronic devices capable of executing machine-readable program instructions. Server computer 110 may include internal and external hardware components, as depicted and described in further detail with respect to FIG. 6.

Processor 104 is at least one central processing unit (CPU) for server computer 110 and receives data and/or instructions from cache memory 116. Processor 104 performs operational steps of all software transactions on server computer 110 including data splitting program 300 and compiling operations of compiler 113. Cache memory 116 is a memory component of server 110 that provides a localized memory to feed data to and receive data directly from processor 104. Compiler 113 provides a software compiler function that translates a software program written in a high-level programming language, into a low-level machine language required for computer operation. Compiler 113 includes a forward pass and a backward pass, each of which includes phases in which specific operational tasks are performed.

Software cache 115 is a small section of server computer 110's main memory that has been defined to perform a caching role in support of data splitting program 300. Software cache 115 holds data from an array or aggregate member array in an original layout prior to data splitting being performed on an array or dynamic object having aggregate member arrays. Software cache 115 is used to reduce the overhead requirement of bit manipulation of split data when code references from other areas of the code require the "non-split" or original array data.

Data splitting program 300 works in conjunction with compiler 113 to perform compiling operations and modifications to source code 120. In one embodiment of the present invention, data splitting program 300 is a separate program module called by compiler 113 during compiling operations. In another embodiment, data splitting program 300 is an integrated part of compiler 113. Data splitting program 300 creates software cache 115 from a small portion of server computer 110's main memory. Data splitting program 300 analyzes the entire program code of source code 120 and determines opportunities to achieve optimal cache utilization and efficiency for the entirety of source code 120. Data splitting program 300 will be discussed in greater detail in regards to FIG. 3.

Figure 2:
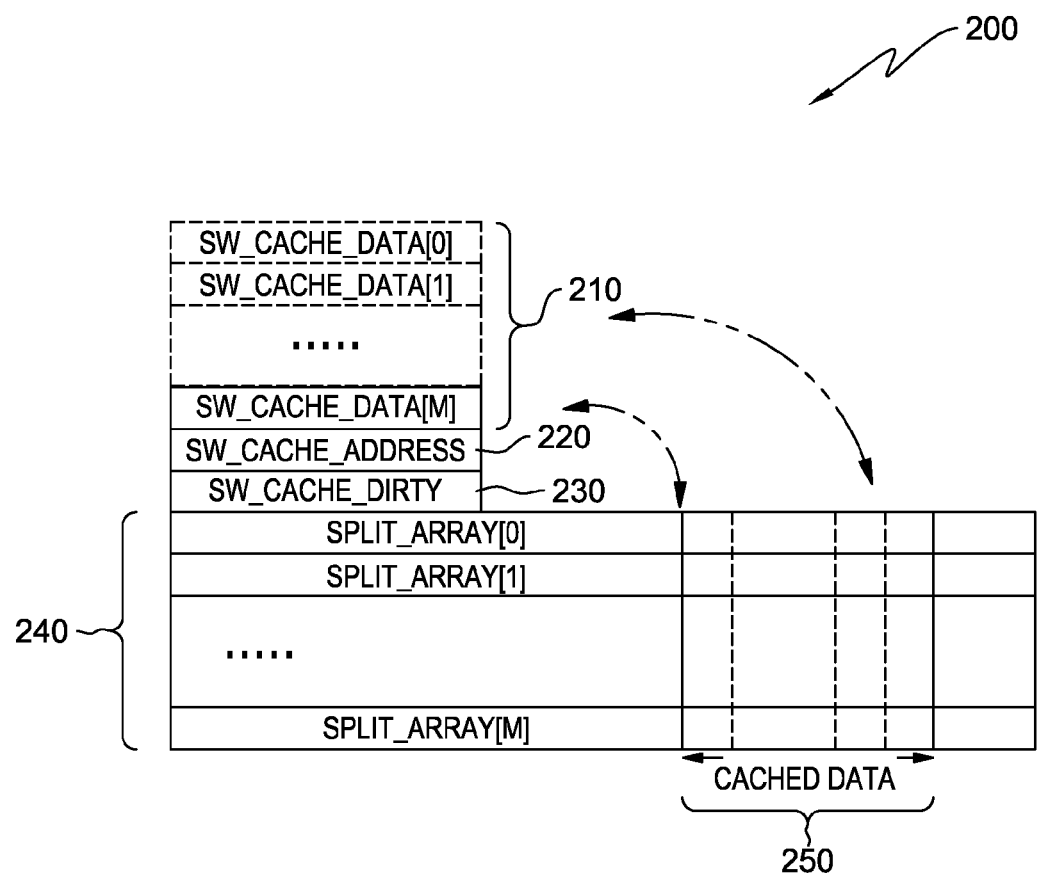
FIG. 2 is an exemplary illustration of the memory layout of an object instance after data splitting, including a software cache, within the data processing environment of FIG. 1, in accordance with an embodiment of the present invention.

FIG. 2 is an exemplary illustration of memory layout 200 of a dynamic object instance after data splitting, including a software cache, within the data processing environment of FIG. 1, in accordance with an embodiment of the present invention. Memory layout 200 includes software cache data 210, software cache address 220, software cache dirty 230, and the split data of an array or a dynamic object instance represented by split data arrays 240. Cached data 250 is a section of the split arrays from the dynamic object instance that is loaded into software cache data 210. The software cache includes software cache data 210, software cache address 220, and software cache dirty 230. Software cache data 210 contains cached data 250 of the split arrays in the original data format, thereby the software cache data 210 is a transposed representation of cached data 250.

Embodiments of the present invention achieve optimal cache utilization and improved cache efficiency for the entire program at runtime, by using techniques to split arrays based on usage of array element fields within code pattern references within the program. Although embodiments may be applied to arrays or aggregate member arrays, hereafter, the term "array" will be used for convenience of reference, with the understanding that the application of the embodiments are not limited to only arrays.

Software cache data 210 is a small block of memory used to hold a small number of array elements in the original data structure layout. The runtime overhead may be high for each load and store operation of the original data due to the bit/byte operations for data conversion with the splitting data. The data in software cache data 210 is used to reduce the runtime data manipulation overhead for the array references in the code regions of the program where the data are referenced in the original data layout. The number of cached data is chosen to be the same number of total separated arrays, and each of the cached data will have the same size as the original array element that has been split. When a load operation is executed at runtime, if the data are not cached, the data currently residing in software cache data 210 are flushed and a number of the consecutive split data from each split array are copied to software cache data 210. If the data are within software cache data 210, the data are directly loaded from the cache.

Software cache address 220 is the address that identifies the starting location for a number of consecutive split data for each split array. Software cache address 220 is used to locate the required data in software cache data 210. Software cache dirty 230 is at least one variable that indicated the cache state for clearing cache and repopulating with referenced split array sections, and is used in conjunction with library functions 500.

Split data arrays 240 are smaller arrays created by splitting each element of the original array into smaller pieces. Splitting the original array allows use of smaller array elements that better utilize system cache, by determining the data size most frequently used within the code reference patterns of the program. For example, if the data to be split is a 64-bit integer array with N elements, and it is determined from code reference patterns of the program to split the original array of 64×N bits into M uniform separate arrays. The split is such that each element of a new split array is 64/M bit(s), in which case the array may be a bit array (M=64), a byte array (M=8) or a short integer array (M=2, or 4), depending on the code patterns of the references in the code. The splitting of the original array is such that a given cross section of all split arrays is a transposed element of the original array. As another example, it may be determined from code reference patterns of the program to split the original array of 64×N bits into M non-uniform separate arrays. The split is such that elements of the new split arrays do not all have the same size, for example, the array may be split into M=15 separate arrays including 8 bit arrays and 7 byte arrays depending on the code patterns of the references in the code.

Cached data 250 is the data that populates software cache data 210. Cached data 250 is a cross section of the most recently referenced data from split data arrays 240, with the number of elements matching the number of split arrays. Each element of cached data 250 has the same size element as the original array elements that were split, thus cached data 250 is a transposed form of data in split data arrays 240. Cached data 250 is used mostly for load and store operations, with the split data being updated from the cached data, using well-tuned fast transposing code in the library, to be discussed further in regards to FIG. 5.

Figure 3:
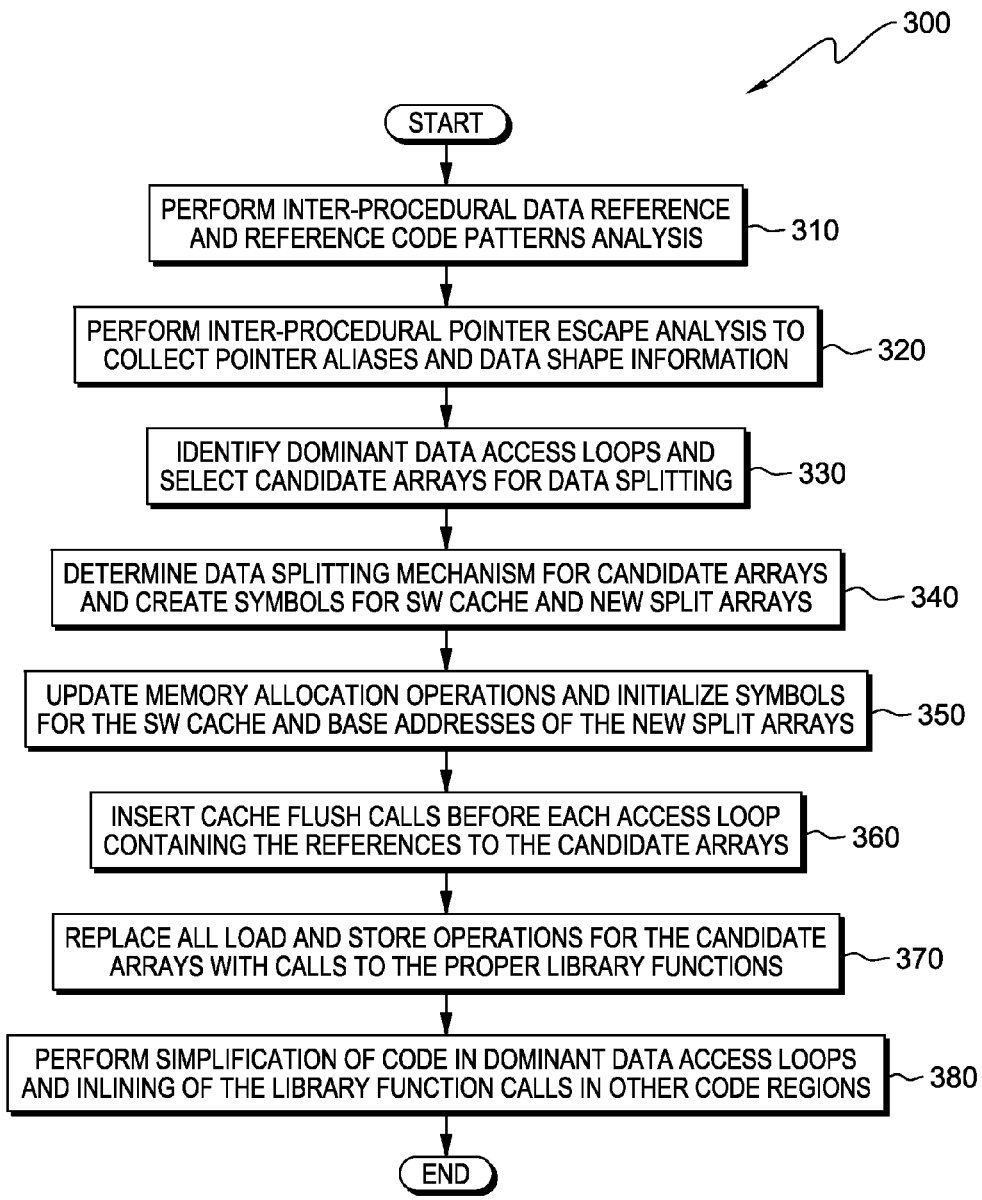
FIG. 3 is a flowchart depicting operational steps of a data splitting program, using a "software cache", inserted on a computing device within the data processing environment of FIG. 1, in accordance with an embodiment of the present invention.

FIG. 3 is a flowchart depicting operational steps of data splitting program 300, including a software cache, inserted on a computing device within the data processing environment of FIG. 1, in accordance with an embodiment of the present invention. Data splitting program 300, working in conjunction with compiler 113 (FIG. 1) carries out a two-pass traversal of a call graph generated for the code being compiled, such as source code 120. A call graph is a graphical representation of all the function calls within the program, showing the relationship of the "caller" function to the "callee" function.

Data splitting program 300 performs an inter-procedural data reference and reference code patterns analysis (step 310). An inter-procedural data reference analysis determines the instances of data references that occur within the entire program. Data references may include a single instantiation, such as a single instance of an array (dynamic object), or multiple instantiations. By performing an inter-procedural data reference analysis for the arrays in the program, data splitting program 300 determines the instances and location of references in the code, and the pattern and context of calls referencing the data of the arrays. Data splitting program 300 traverses the call graph in the reverse depth-first order (top-down), and collects the field reference pattern information including the frequency information for all the loops in the program and the code patterns of the field references for all arrays.

Data splitting program 300 performs an inter-procedural pointer escape analysis to collect pointer aliases and data shape information (step 320). Objects or components of objects can be referenced by using a pointer to a memory location. Pointer analysis is a technique that establishes which pointers point to which variables, or storage locations. If a subroutine allocates an object and returns a pointer to it, the object can be accessed from undetermined places in the program, producing the impression that the pointer has "escaped". Pointers can also escape if they are stored in global variables or other data structures that, in turn, escape the current procedure. Escape analysis determines all the places where a pointer can be stored and whether the pointer is restricted only to the current procedure and/or thread.

The inter-procedural pointer escape analysis is field sensitive and is used to collect the aliasing and the shape information for all the dynamic objects and static arrays. The aliasing information is used to insure that pointers to data manipulated while in software cache data 210 point to the updated version of data. The shape information includes the structural shape and/or array shape. Structural shape describes the field-level view of a singular data object, such as the number of fields, the offset, and the length of each field. The array shape is the view of an array, consisting of the number of dimensions and the stride for each dimension of the array, which is the number of locations in memory between the beginnings of successive array elements.

Having collected data and reference code patterns, aliases, and data shape information, data splitting program 300 identifies dominant data access loops and selects candidate arrays for data splitting (step 330). At the end of the compiler forward pass, data splitting program 300 analyzes the collected information and the alias and shape information to find all the arrays that are safe to do data splitting, and performs a cost analysis for data splitting.

A cost analysis for data splitting determines if there are adequate candidate arrays (or candidate objects) to be considered for selection for data splitting, and if an acceptable level of benefit from data splitting can be realized. Safe data splitting refers to the concern that splitting data will still produce the correct result for program transactions. Dominant data access loops are identified for each data or member of an aggregate data if they are all referenced with the same dominant access pattern. The reference code patterns and loop frequency information are used to compute the dominant data access pattern for the arrays.

For example, one object of a program is a structure with 8 integer array members. The data reference code pattern analysis indicates a dominant access pattern of only 1 of the integer array members being used in the majority of loops identified in the program.

Data splitting program 300 determines a data splitting mechanism for candidate arrays and creates symbols for software cache and new split arrays (step 340). The data splitting mechanism or data splitting mode, is the manner or way in which the splitting of data is best accomplished to maintain expected program results and achieve higher levels of cache utilization. Data splitting program 300 selects the candidates for data splitting and determines how the candidate arrays are to be split, based on the dominant data access pattern, and splits the data. Embodiments of the present invention recognize that known data splitting techniques are limited in how array data is split. Embodiments of the present invention enable data splitting at a bit level, multiple bit level, a byte level, a word or double word level; whatever level of object splitting optimizes cache utilization. Data splitting program 300 creates a software cache that includes software cache data 210, software cache address 220 and software cache dirty flag 230. The number of cache data elements is the same as the number of arrays into which the original array was split. Each of the cache data elements will have the same size as the original array elements that are split.

Data splitting program 300 creates variables for software caching, including variables to identify the cached data, the address of cached data, and a cache dirty flag for each split data. The variables or "symbols", used in programs for identification, are used for the newly created split arrays, for the address of cached data to locate the data in memory, and the cache dirty flag variable used to indicate the state of the data in software cache data 210. If the data has been manipulated or changed, the state of the data is flagged as "dirty" and this information is used to determine if updates to the data in software cache data 210 have been made so that other instances of the data can be updated for data consistency. Data splitting program 300 also creates an indexed address variable for the split array to facilitate the code transformation. The indexed base array address variable contains the value of the addresses of the separated arrays.

Having split the array data and created symbols for the software cache components, data splitting program 300 updates memory allocation operations and initializes the symbols for the software cache and base addresses of the new split arrays (step 350). Traversing the call graph during the backward pass in a depth-first order (bottom-up), the intermediate representation of the code being compiled is modified. The memory allocation for each of the selected arrays (objects) is replaced by an allocation with a total size comprising the split data plus the software cache, the cached address, the cache state variables and possible padding.

For example, if the original array has a size of 64 bits per element and is N elements in length, it has a total memory allocation of 64×N bits. The total allocation size of the array split into M smaller arrays, with software cache will be: 64×N+64×M+64+64 bits (with no padding assumed).

Continuing with the backward pass of compiling operation, data processing program 300 inserts cache flush calls before each dominant data access loop containing the references to the candidate arrays (step 360). For the dominant data access loop, a function call is inserted at the beginning of the loop to flush the cache data. This is included to update the split arrays with any changes made to the data in software cache data 210, prior to loading different portions of data to software cache data 210 for subsequent loop transactions.

Data splitting program 300 then proceeds to replace all load and store operations for the candidate arrays with calls to the proper library functions (step 370). In the dominant data access loop, the load and store operations are transformed to an indexed form of base address of the split data. This insures consistency of the data as it is used throughout the program. The transformed load and store operations may be further optimized to reduce the loop iterations. All other load operations and store operations are replaced by a call to a corresponding library function.

Having completed data splitting operations, data splitting program 300 performs simplification of the code in dominant data access loops and in-lining of the library function calls in other code regions of the program (step 380). To simplify the code, operations that have been transformed, due to data splitting and use of a software cache, may be replaced by inlining techniques, and other optimizations to reduce loop iterations. After all data references are replaced, library function calls are inlined to simplify the code. Data splitting program 300 stores the portion of the data of the split arrays that are in a transposed format within the software cache, and consults the software cache during an access of the split arrays. After the code optimizations are complete and the library functions are in place, data splitting program 300 ends.

As a simplified example, a fictitious bank handles checking accounts in a special way. All accounts must be $9,999 or less and all accounts are for dollar amounts only. The bank gives free checking to account holders with balances equal to or greater than $1000. The data for all accounts are maintained in a program structure and one member of the structure is an array of account information. Each account of the member array is 64 bits of which 16 bits are used to provide binary coded decimal values of the balance in the account. Binary coded decimal means that each decimal digit, 0-9, of the account balance is represented by 4 bits in binary code. One additional bit is used by the bank to determine if the account is "active", which means there has been some activity within a set period of time. The rest of the 64 bits are used by the bank for account and identification data.

The bank has a program to determine which accounts qualify for free checking. For an example computer processor with a 64 bit system cache, the program would load 64 bits into cache, however only 4 bits would be used, shifting the first 12 bits and 'reading' the highest 4 bits to determine if a non-zero decimal digit was represented. The other 64 bits that are loaded into system cache are wasting cache bandwidth.

Alternatively if the member array were split so that the highest 4 bits of each account balance were included in a single split array, then 16 accounts could populate the system cache at one time, improving memory locality for the program function. If functions in other regions of the program code required data in the format of the original member array, a copy of a portion of the original format data most frequently used, transposed from split data arrays 240, is kept in a second component of the software cache, such as software cache data 210 (FIG. 2), to enable transactions without added bit manipulation overhead.

FIG. 4 illustrates exemplary code featuring an iterative loop, before and after applying data splitting with a software cache, in accordance with an embodiment of the present invention. Loop 410 is an iterative loop abstracted from memory-bound benchmark of CPU2006 libquantum (gates.c), which is a benchmark used for simulation for physics and quantum computing. The loop accesses a 16-byte structure (struct) "node", which is part of struct "reg", but only one or two bits of the variable "state" are used in the loop. The other bits of the variable "state" and the other parts of the struct "note" remain unused. When the data is loaded into system cache, such as cache memory 116, most of the data loaded is wasted and ultimately evicted from cache memory 116 without being used. Embodiments of the present invention further split the data to the level of the referenced bits so that data fetches to cache include minimal amounts of unused data.

Split data loop 420 illustrates the exemplary code after the data splitting process is complete. Split data loop 420 includes a function call at the beginning of the loop to flush the software cache data. Assuming that the loop shown is identified as the dominant data access loop, and the variable "state" is 64 bits, the data is split into 64 one-bit arrays. In loop 410, the total number of data accessed is 64 bits times the loop iteration count of "reg→node", however, only up to 2 bits of the variable "state" are used. After splitting the data into 64 separate bit arrays, the total number of data accessed is at most 2 bits times the loop iteration count of "reg→node".

Figure 5:
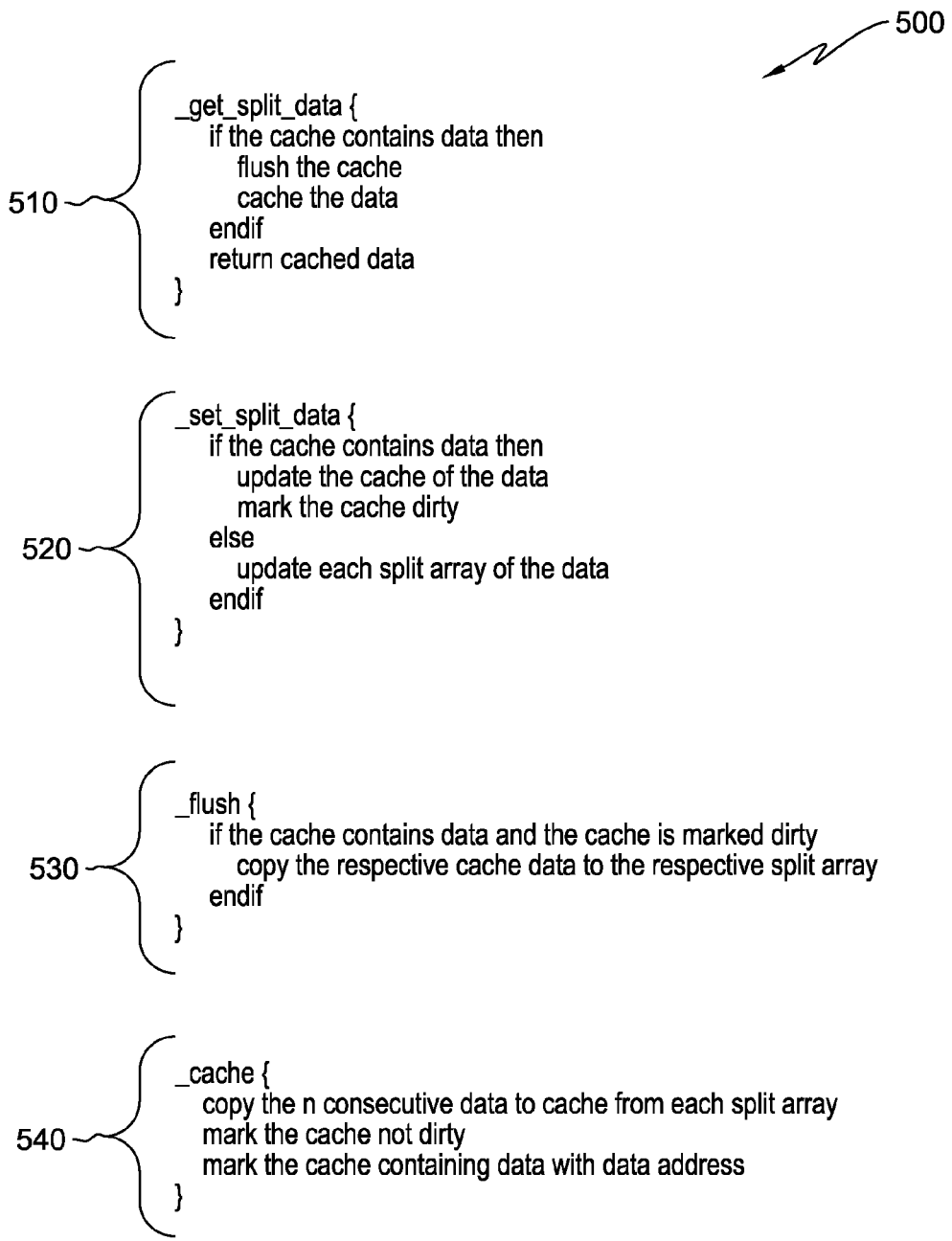
FIG. 5 illustrates exemplary pseudo code for library functions supporting the software cache, in accordance with an embodiment of the present invention.

FIG. 5 illustrates exemplary pseudo code for library functions 500 supporting the software cache, in accordance with an embodiment of the present invention. Pseudo code is an informal high-level description of the operating principle of part or all of a computer program. Library functions 500 includes the pseudo code for the functions: _get_split_data 510, _set_split_data 520, _flush 530, and _cache 540. All load and store operations outside the dominant data access loop in the program being compiled, such as source code 120, are replaced with calls to library functions 500. The functions _get_split_data 510 and _set_split_data 520 may have variations of the pseudo code presented for different data type splitting. The load operations are replaced with _get_split_data 510. This function and its variations are called to replace the load operations in the non-dominant data access loops. The function, _get_split_data 510 will flush software cache data 210 and load the current indexed data into software cache data 210, if needed. The function _get_spit_data 510 returns the data from the cache.

The store operations are replaced with the function _set_split_data 520, which is called to replace the store operations in non-dominant data access loops. If current indexed data is cached, _set_split_data 520 updates the cache and sets the cache dirty flag. Otherwise it sets the data of the split array directly. The library function that is used to copy cached data to the split arrays, if the cache is flagged as "dirty" (changed or updated), is _flush 530. The cache is updated by calls to _cache 540, which updates the cache with data from the split arrays.

For example, the load and store operations for the dominant data access loop of source code 120 use an indexed form of base address of the split data. Other loops in source code 120 use a library call to _get_split_data 510 to flush the data from software cache data 210 (FIG. 2), and cache the current indexed data into software cache data 210. Updates to the current indexed data in cache, initiates a call to the function _set_split_data 520, which in response to updates made to the cached data, sets the flag for cache dirty 230 indicating that the data is updated. If the flag for software cache dirty 230 is set, the function _flush 530 copies cache data to the split arrays. When the software cache data 210 is updated, data from the split arrays is cached to software cache data 210 by function _cache 540.

Figure 6:
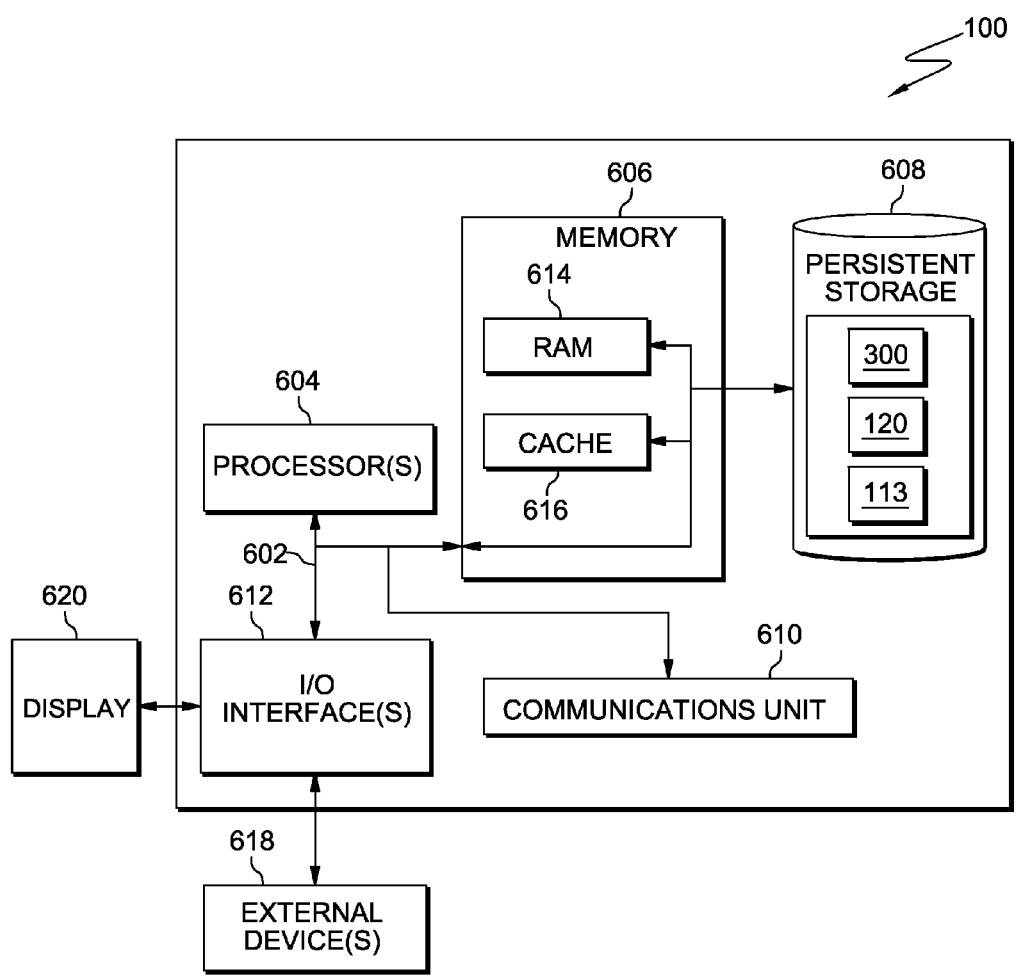
FIG. 6 depicts a block diagram of components of a computer system capable of performing the operational steps of a data splitting program using a software cache, in accordance with an embodiment of the present invention.

FIG. 6 is a block diagram illustrating the components of computer system 600 capable of performing the operational steps of data splitting program using a software cache, in accordance with an illustrative embodiment of the present invention. Computer system 600 is only one example of a suitable computer system and is not intended to suggest any limitation as to the scope of use or functionality of embodiments of the invention described herein. Computer system 600 is capable of being implemented and/or performing any of the functionality set forth hereinabove. It should be appreciated that FIG. 6 provides only an illustration of one implementation and does not imply any limitations with regard to the environments in which different embodiments may be implemented. Many modifications to the depicted environment may be made.

Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Data splitting program 300, compiler 113, and source code 120 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of distributed data processing environment 100. In these examples, communications unit 610 includes one or more network interface cards. Communications unit 610 may provide communications through the use of either or both physical and wireless communications links. Data splitting program 300, compiler 113 and source code 120 may be downloaded to persistent storage 608 through communications unit 610.

I/O interface(s) 612 allows for input and output of data with other devices that may be connected to computer system 600. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., data splitting program 300, compiler 113, and source code 120, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for data splitting of an array using a software cache, the computer program product comprising:
one or more non-transitory computer-readable storage medium(s) and program instructions stored on the one or more non-transitory computer-readable storage medium(s), the program instructions comprising:
program instructions to collect information for a dominant data access loop and reference code patterns based on data reference pattern analysis, and for pointer aliasing and data shape based on pointer escape analysis;
program instructions to select a candidate array for data splitting based on the reference code patterns, the pointer aliasing, and the data shape information, wherein the candidate array is referenced by a dominant data access loop;
program instructions to determine a data splitting mode by which to split the data of the candidate array, based on the reference code patterns, the pointer aliasing, and the data shape information;
program instructions to split the data of the candidate array into two or more split arrays, based on the reference code pattern; and
program instructions to create a software cache wherein the software cache includes a portion of the data of the two or more split arrays in a transposed format; and
program instructions to maintain the portion of the data of the two or more split arrays in the transposed format within the software cache and consult the software cache during an access of the two or more split arrays.

2. The computer program product of claim 1, wherein the software cache includes in part, a cache data address and a cache data state flag, wherein the cache data address corresponds to the address of the portion of the data of the two or more split arrays in a transposed format and the cache data state flag indicates whether the portion of the data has been updated.

3. The computer program product of claim 1, further comprising:
in response to changes made to the portion of the data of the two or more split arrays in a transposed format included within the software cache, program instructions to access library functions to update the data of the at least two split arrays.

4. The computer program product of claim 1, further comprising:
program instructions to insert a function call to flush the portion of the data of the two or more split arrays in the transposed format included within the software cache at a beginning of the dominant data access loop.

5. The computer program product of claim 1, further comprising:
program instructions to initialize symbols created to identify cache address, cache data state flag, the portion of the data of the two or more split arrays in the transposed format and the at least two split arrays.

6. The computer program product of claim 1, wherein load and store operations for the dominant data access loop are replaced with an indexed form of base address for the at least two split arrays.

7. The computer program product of claim 1, wherein load and store operations for non-dominant data access loops are replaced with a call to library functions.

8. The computer program product of claim 1, wherein the candidate array is at least a single instantiation of a member of an aggregate dynamic object.

9. A computer system for data splitting of an array using a software cache, the computer system comprising:
one or more computer processors;
one or more computer-readable storage medium(s);
program instructions stored on one of the one or more computer-readable storage medium(s) for execution by at least one of the one or more processors, the program instructions comprising:
program instructions to data splitting of an array using a software cache, the method comprising:
one or more computer-readable storage medium(s) and program instructions stored on the one or more computer-readable storage medium(s), the program instructions comprising:
program instructions to collect information for a dominant data access loop and reference code patterns based on data reference pattern analysis, and for pointer aliasing and data shape based on pointer escape analysis;
program instructions to select a candidate array for data splitting based on the reference code patterns, the pointer aliasing, and the data shape information, wherein the candidate array is referenced by a dominant data access loop;
program instructions to determine a data splitting mode by which to split the data of the candidate array, based on the reference code patterns, the pointer aliasing, and the data shape information;
program instructions to split the data of the candidate array into two or more split arrays, based on the reference code pattern; and
program instructions to create a software cache wherein the software cache includes a portion of the data of the two or more split arrays in a transposed format; and
program instructions to maintain the portion of the data of the two or more split arrays in the transposed format within the software cache and consult the software cache during an access of the two or more split arrays.

10. The computer system of claim 9, wherein the software cache includes in part, a cache data address and a cache data state flag, wherein the cache data address corresponds to the address of the portion of the data of the two or more split arrays in a transposed format and the cache data state flag indicates whether the portion of the data has been updated.

11. The computer system of claim 9, further comprising:
in response to changes made to the portion of the data of the two or more split arrays in a transposed format included within the software cache, program instructions to access library functions to update the data of the at least two split arrays.

12. The computer system of claim 9, wherein the candidate array is at least a single instantiation of a member of an aggregate dynamic object.

* * * * *